United States Patent
Whang et al.

(10) Patent No.: US 10,643,571 B2
(45) Date of Patent: *May 5, 2020

(54) DISPLAY DEVICE AND METHOD FOR OPERATING IN A PLURALITY OF MODES AND DISPLAYING CONTENTS CORRESPONDING TO THE MODES

(71) Applicant: SAMSUNG ELECTRONICS CO., LTD., Suwon-si (KR)

(72) Inventors: Se Jung Whang, Seoul (KR); Jee Soo Kim, Goyang-si (KR); Kang Il Chung, Bucheon-si (KR); Dong Wook Han, Suwon-si (KR); Young Kwang Seo, Suwon-si (KR); Eun Seok Choi, Suwon-si (KR); Jin Hyuk Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,986

(22) Filed: Jul. 30, 2019

(65) Prior Publication Data

US 2019/0355324 A1    Nov. 21, 2019

Related U.S. Application Data

(63) Continuation of application No. 15/848,279, filed on Dec. 20, 2017, now Pat. No. 10,467,979.

(30) Foreign Application Priority Data

Dec. 20, 2016   (KR) .................. 10-2016-0174703

(51) Int. Cl.
*G09G 3/36* (2006.01)
*G09G 5/00* (2006.01)
(Continued)

(52) U.S. Cl.
CPC ............ *G09G 5/003* (2013.01); *G06T 7/246* (2017.01); *G06T 7/60* (2013.01); *G09G 5/00* (2013.01);
(Continued)

(58) Field of Classification Search
CPC .......... G09G 2310/08; G09G 2360/14; G09G 5/003; G09G 5/005; G06F 3/017
(Continued)

(56) References Cited

U.S. PATENT DOCUMENTS 6,374,145 B1   4/2002   Lignoul
6,404,447 B1   6/2002   Kitagawa
(Continued)

FOREIGN PATENT DOCUMENTS

EP   3 023 859 A1   5/2016
JP   10-83146 A     3/1998
(Continued)

OTHER PUBLICATIONS

Search Report and Written Opinion dated Apr. 5, 2018, issued by the International Searching Authority in International Application No. PCT/KR2017/014992 (PCT/ISA/210 and PCT/ISA/237).
(Continued)

*Primary Examiner* — Roy P Rabindranath
(74) *Attorney, Agent, or Firm* — Sughrue Mion, PLLC

(57) ABSTRACT

A display device and method are provided. The display device includes a display, a first sensor, and a processor. The first sensor senses movement. The processor is operatively connected with the display, and the first sensor, and operates in one of a first mode and a second mode, the first mode being a mode in which a dynamic image is displayed in the display and the second mode being a mode in which a static image is displayed in the display. In response to a movement of a user being sensed by the first sensor, in the second mode (Continued)

within a first critical time, the processor controls the display to display the static image.

20 Claims, 10 Drawing Sheets

(51) Int. Cl.
    *G06T 7/246* (2017.01)
    *G06T 7/60* (2017.01)
    *H04N 21/443* (2011.01)
    *H04N 21/431* (2011.01)
    *H04N 21/442* (2011.01)
    *H04N 21/422* (2011.01)
    *H04N 21/4223* (2011.01)
    *H04N 21/41* (2011.01)

(52) U.S. Cl.
    CPC ..... *H04N 21/4126* (2013.01); *H04N 21/4223* (2013.01); *H04N 21/42202* (2013.01); *H04N 21/42204* (2013.01); *H04N 21/4312* (2013.01); *H04N 21/4436* (2013.01); *H04N 21/44218* (2013.01); *G06T 2207/30196* (2013.01); *G09G 2320/0613* (2013.01); *G09G 2330/022* (2013.01); *G09G 2340/14* (2013.01); *G09G 2354/00* (2013.01); *G09G 2360/144* (2013.01)

(58) Field of Classification Search
    USPC .......................................................... 345/99
    See application file for complete search history.

(56) References Cited

U.S. PATENT DOCUMENTS

| | | | | |
|---|---|---|---|---|
| 9,196,239 | B1* | 11/2015 | Taylor | G06F 3/017 |
| 10,386,919 | B2* | 8/2019 | Jassal | G06F 3/012 |
| 2002/0095222 | A1 | 7/2002 | Lignoul | |
| 2010/0002009 | A1 | 1/2010 | Takata | |
| 2010/0328284 | A1 | 12/2010 | Noguchi | |
| 2012/0044139 | A1* | 2/2012 | Kim | H04N 5/4403 |
| | | | | 345/157 |
| 2012/0206340 | A1 | 8/2012 | Mori et al. | |
| 2014/0111500 | A1 | 4/2014 | Kasuga | |
| 2015/0212575 | A1 | 7/2015 | Song et al. | |
| 2016/0109955 | A1 | 4/2016 | Park et al. | |
| 2016/0125571 | A1 | 5/2016 | Ohno | |
| 2016/0150472 | A1 | 5/2016 | Yoon et al. | |
| 2016/0273908 | A1 | 9/2016 | Rose et al. | |
| 2016/0314762 | A1 | 10/2016 | Lee et al. | |
| 2017/0018248 | A1 | 1/2017 | Na | |
| 2017/0229059 | A1 | 8/2017 | Bonnier et al. | |
| 2017/0249919 | A1 | 8/2017 | Bae et al. | |
| 2017/0345360 | A1 | 11/2017 | Lee et al. | |

FOREIGN PATENT DOCUMENTS

| | | |
|---|---|---|
| JP | 2010-61496 A | 3/2010 |
| JP | 2010-206372 A | 9/2010 |
| JP | 2011-13722 A | 1/2011 |
| KR | 1998-017450 U | 7/1998 |
| KR | 10-2009-0075326 A | 7/2009 |
| KR | 10-2011-0011804 A | 2/2011 |
| KR | 10-2016-0060972 A | 5/2016 |

OTHER PUBLICATIONS

Communication dated Apr. 29, 2019, issued by the European Patent Office in counterpart European Application No. 17883018.8.

* cited by examiner

COLLECTION LIST (330)

1. LANDSCAPES
2. DRAWINGS
3. STILL LIFE
4. LAND ART
5. ARCHITECTURE
6. DIGITAL ART
7. ACTION
8. PATTERNS
9. STREET ART
10. WILDLIFE

FIG. 4B

DISPLAY DEVICE AND METHOD FOR OPERATING IN A PLURALITY OF MODES AND DISPLAYING CONTENTS CORRESPONDING TO THE MODES

CROSS-REFERENCE TO RELATED APPLICATION

This is a Continuation of U.S. application Ser. No. 15/848,279, filed Dec. 20, 2017, which claims priority under 35 U.S.C. § 119(a) from a Korean patent application filed on Dec. 20, 2016 in the Korean Intellectual Property Office and assigned Serial number 10-2016-0174703, the disclosures of each of which are incorporated by reference herein in their entireties.

BACKGROUND

1. Field

The present disclosure broadly relates to a display device and a display method that displays a specified image in a low-power mode and operate in a plurality of modes.

2. Description of Related Art

A display device such as a television (TV) or the like may provide a specific function (e.g., to play image contents) in an on state and may be turned off when not providing the specific function. If being turned off, the conventional display device may maintain a black screen state.

SUMMARY

Since maintaining a black screen in an off state, a conventional display device may make a display environment, to which the display device is applied, plain and unattractive. To solve the issue, if the conventional display device (e.g., personal computer (PC)) stands by in an on state, the conventional display device may provide a screen for beautification (e.g., a screen saver). However, when operating in the on state, the conventional display device may provide the screen for beautification depending on a user input.

Various exemplary embodiments may provide a display device and a method that display the screen for beautification (e.g., a static image) after being turned on automatically and operate in a plurality of modes.

In accordance with an aspect of an exemplary embodiment, a display device includes a display, a first sensor sensing movement, a second sensor sensing illuminance, and a processor operatively connected with the display, the first sensor, and the second sensor. The processor is configured to operate in a first mode or a second mode, the first mode being a mode in which a dynamic image is displayed in the display, and the second mode being a mode in which a static image is displayed in the display, to set a first critical time for sensing the movement based on the illuminance, and, if specified movement of an user is sensed in the second mode within the first critical time, to display the static image in the display.

In accordance with an aspect of an exemplary embodiment, the display device operates in a first mode or a second mode. The first mode is a mode in which a dynamic image is displayed in a display, and the second mode is a mode in which a static image is displayed in the display. A display method of a display device includes sensing illuminance by using a first sensor, setting a first critical time based on the sensed illuminance, sensing movement by using a second sensor during the first critical time in the second mode, and, if specified movement of an user is sensed within the first critical time in the second mode, displaying the static image in the display.

Other aspects, advantages, and salient features of the disclosure will become apparent to those skilled in the art from the following detailed description, which, taken in conjunction with the annexed drawings, discloses various exemplary embodiments.

According to various exemplary embodiments, the screen for beautification may be displayed after being turned on automatically.

BRIEF DESCRIPTION OF THE DRAWINGS

The above and other aspects, features, and advantages of exemplary embodiments will be more apparent from the following description taken in conjunction with the accompanying drawings. Understanding that these drawings depict only exemplary embodiments and are not therefore to be considered to be limiting of the scope of the disclosure, the principles herein are described and explained with additional specificity and detail through the use of the accompanying drawings, in which:

FIG. 4B is a view illustrating a second user interface of a collection category according to an exemplary embodiment;

Throughout the drawings, it should be noted that like reference numbers are used to depict the same or similar elements, features, and structures.

DETAILED DESCRIPTION OF EXEMPLARY EMBODIMENTS

Figure 1:
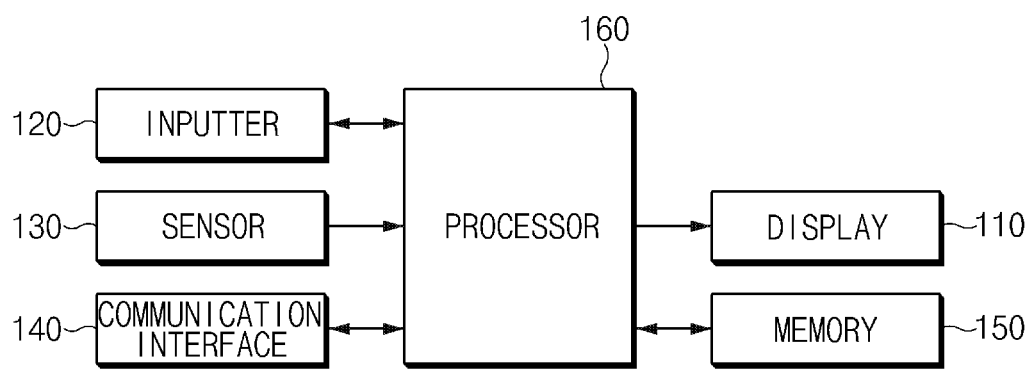
FIG. 1 is a block diagram illustrating a display device according to an exemplary embodiment.

Below, various exemplary embodiments will be described with reference to accompanying drawings. However, those of ordinary skill in the art will recognize that modification, equivalent, and/or alternative on the various exemplary embodiments described herein can be variously made without departing from the scope and spirit of the present disclosure. With regard to description of drawings, similar elements may be marked by similar reference numerals.

Figure 2:
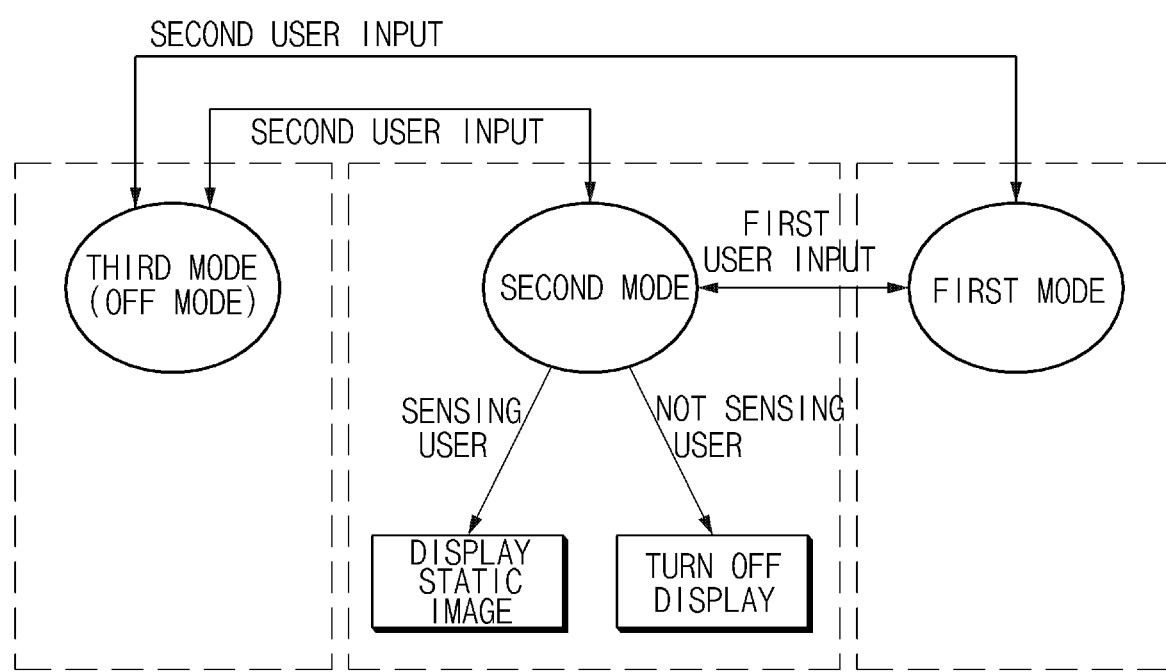
FIG. 2 is a diagram illustrating each driving mode of a display device according to an exemplary embodiment.

FIG. 1 is a block diagram of a display device, according to an exemplary embodiment. FIG. 2 is a diagram illustrating each driving mode of a display device, according to an exemplary embodiment.

Referring to FIG. 1, according to an exemplary embodiment, a display device 10 may include a display 110, an inputter or an input module 120 (or input device, or input interface), a sensor or a sensor module 130, a communication interface or a communication module 140 (or communication circuit), a memory 150, and a processor 160. According to an exemplary embodiment, the display device 10 may exclude some elements or may further include other additional elements. Alternatively, according to an exemplary embodiment, some of the elements of the display device 10 may be combined with each other so as to form one entity, so that the functions of the elements may be performed in the same manner as before the combination. The relation between the input and the output illustrated in FIG. 1 may be exemplified for descriptive convenience. Accordingly, exemplary embodiments may not be limited thereto.

According to an exemplary embodiment, the display device 10 may include at least one of a TV, a monitor, a notebook computer, a Large Format Display (LFD), a smartphone, a tablet personal computer (PC), a mobile phone, a video telephone, an e-book reader, a desktop PC, a laptop PC, a netbook computer, a personal digital assistant (PDA), a portable multimedia player (PMP), a Motion Picture Experts Group (MPEG-1 or MPEG-2) Audio Layer 3 (MP3) player, a camera, a wearable device, or an electronic picture frame.

The display 110 may include, for example, a liquid crystal display (LCD), a light-emitting diode (LED) display, an organic LED (OLED) display, or an electronic paper display. The display 110 may display, for example, various contents (e.g., a text, an image, a video, an icon, and/or a symbol) to a user. According to an exemplary embodiment, the display 110 may be always turned on in a first mode and may be turned on or off in a second mode.

According to an exemplary embodiment, the inputter or an input module 120 may sense or receive a user input and may output a signal corresponding to the sensed or received user input. For example, the input module 120 may include at least one of a communication unit or component or an input button. In an exemplary embodiment, the communication unit may communicate with a remote control device. If the remote control device transmits a control signal corresponding to a button manipulated by a user, the communication unit may receive the control signal from the remote control device and may change the received control signal into a form that is capable of being recognized by the processor 160. If receiving the command signal, which is to be transmitted to the remote control device, from the processor 160, the communication unit may change the received command signal to a command signal corresponding to a communication method of the remote control device and may transmit the changed signal to the remote control device. For example, the communication unit may communicate with the remote control device by using various short range communication methods such as Bluetooth, near field communication (NFC), infrared (IR) communication, and the like. In an exemplary embodiment, the input button may be a button included in the display device 10. In an exemplary embodiment, each of the remote control device and the input button may include a power button. In the case where the input module 120 senses a short press (a first user input) of the power button, the input module 120 may output a first signal. In the case where the input module 120 senses a long press (a second user input) of the power button, the input module 120 may output a second signal.

According to an exemplary embodiment, the sensor or the sensor module 130 may include at least one of an illuminance sensor that senses external illuminance or an image sensor that senses the movement of a user. The latter image sensor may include at least one of a camera sensor or an infrared sensor. The image sensor may capture an image within a specified range. For example, the specified range may be within a first distance (e.g., 6 m) from the center of the image sensor and within a critical angle (e.g., 180 degrees).

According to an exemplary embodiment, the communication module 140 may communicate with an external electronic device in the specified communication method. For example, the specified communication method may include wireless fidelity (Wi-Fi), Bluetooth, NFC, 3G (3rd Generation), LTE (Long Term Evolution), or the like.

The memory 150 may be a volatile memory (e.g., a RAM or the like), a nonvolatile memory (e.g., a ROM, a flash memory, or the like), or the combination thereof. For example, the memory 150 may store instructions or data associated with at least one other element(s) of the display device 10. According to an exemplary embodiment, the memory 150 may store first information for providing a user interface corresponding to a driving mode. The memory 150 may store second information for switching between driving modes. For example, the second information may include a reference for switching a driving mode corresponding to the user input or for switching a state in a second mode, and the like.

For example, the processor 160 may include at least one of a central processing unit (CPU), a graphic processing unit (GPU), a microprocessor, an application specific integrated circuit (ASIC), or field programmable gate arrays (FPGA) and may have a plurality of cores. The processor 160 may perform data processing or an operation associated with control and/or communication of at least one other element(s) of the display device 10.

Referring to FIG. 2, according to an exemplary embodiment, the processor 160 may operate in a first mode, a second mode, or a third mode. For example, the first mode may be a mode for displaying a dynamic image in the display 110. For example, the second mode may be a mode for displaying a static image in the display 110. For example, the first mode may be a high-power mode. The second mode may be a first low-power mode. The third mode may be a second low-power mode. If the second user input is sensed through the input module 120 in the first mode or the second mode, the processor 160 may turn off the devices.

According to an exemplary embodiment, the processor 160 may receive a dynamic image from a first server through an external interface in the first mode and may display the dynamic image by using the display 110. For example, the external interface may be an optical cable, a digital video interactive (DVI), a high definition multimedia interface (HDMI), or the like. For example, in the case where the display device 10 is a TV, the first server may be a server providing a first service, and may be a server of a provider providing a TV service. The dynamic image may be, for example, contents for each channel.

According to an exemplary embodiment, the processor 160 may turn off the sensor module 130 in the first mode and may drive elements, for example, the communication module 140, the memory 150, and the display 110, other than the sensor module 130. In the first mode, the processor 160 may control the backlight of the display 110 to be set to first brightness. For example, the first brightness may be brightness brighter than the brightness of the backlight of the second mode.

According to an exemplary embodiment, the processor 160 may drive the image sensor in the second mode and may sense the movement of a user by using the captured image of the image sensor during at least a first critical time. In the case where the movement of the user is sensed from the captured image within the first critical time, the processor 160 may display the static image by using the display 110. When displaying the static image, the processor 160 may control the backlight of the display 110 to be set to second brightness (<the first brightness). For example, the first critical time may be a reference for determining the number of images, which are used to sense the movement, from among the captured images received from the image sensor, and may be automatically set based on illuminance. In the second mode, the processor 160 may display a static image, which is set to a default image, from among the static images stored in the memory 150 in the display 110. For example, the static image may include a famous painting image, a picture image, a still image, or the like.

According to an exemplary embodiment, in the second mode, in the case where the movement of the user is not sensed during a second critical time in a state where the static image is displayed in the display 110, the processor 160 may turn off the display 110. In the case where the processor 160 turns off the display 110, the processor 160 may also turn off the backlight. The second critical time may be a time that is manually set through the input module 120. As such, in an exemplary embodiment, the state of the processor 160 may be automatically switched to a first state in which the static image is displayed in the display 110, or a second state in which the display 110 is turned off, depending on whether the movement of the user is sensed in the second mode.

In an exemplary embodiment, in the case where "always on display (AOD)" is set in the second mode, the processor 160 may not turn off the display 110 depending on whether the movement of the user is sensed. In this case, since there is no need to sense the movement of the user, the processor 160 may turn off the sensor module 130.

According to an exemplary embodiment, the processor 160 may set or change a first critical time based on the illuminance sensed by using an illuminance sensor. For example, as the illuminance sensed through the sensor module 130 becomes lower, the processor 160 may increase a first critical time. As the illuminance sensed through the sensor module 130 becomes higher, the processor 160 may decrease the first critical time. For another example, the processor 160 may set a specified time to the first critical time with respect to each illuminance range. In particular, if the sensed illuminance is less than 10 [lux], the processor 160 may set the first critical time to 5 seconds. If the sensed illuminance is not less than 10 [lux] and is less than 20 [lux], the processor 160 may set the first critical time to 3 seconds. If the sensed illuminance is not less than 20 [lux], the processor 160 may set the first critical time to 2 seconds. As such, in an exemplary embodiment, when the illuminance is reduced, a time (the first critical time) when the movement of the user is sensed may be extended, and thus the accuracy of detection of the movement of the user may be improved.

According to an exemplary embodiment, if the processor 160 senses a first user input through the input module 120 in the first mode, the processor 160 may switch the driving mode to the second mode, and the processor 160 may operate in the second mode. For example, if the processor 160 receives the first signal in the first mode, the processor 160 may switch the driving mode to the second mode. For example, the first signal may be a signal transmitted in the case where the input module 120 senses the short press (the first user input) of the power button. In an exemplary embodiment, in the case where a third user input is sensed through the input module 120 in the first mode, the processor 160 may switch the driving mode to the second mode, and the processor 160 may operate in the second mode. For example, if the processor 160 receives a third signal in the first mode, the processor 160 may switch the driving mode to the second mode. The third signal may be a signal transmitted in the case where the input module 120 senses the manipulation (a third user input) of a specified function menu of the display device 10. If the processor 160 receives the first user input through the input module 120 in the second mode, the processor 160 may switch the driving mode to the first mode, and the processor 160 may operate in the first mode.

According to an exemplary embodiment, if the second user input is sensed through the input module 120 in the first mode or the second mode, the processor 160 may turn off the sensor module 130, the display 110, the memory 150, and the communication module 140 (hereinafter referred to as "device-off"). For example, if the processor 160 receives the first signal in the first mode or the second mode, the processor 160 may turn off a device. For example, the first signal may be a signal transmitted in the case where the input module 120 senses the long press (the second user input) of the power button. After turning off the sensor module 130, the display 110, the memory 150, and the communication module 140, the processor 160 may be turned off.

According to an exemplary embodiment, if the processor 160 senses a second user input through the input module 120 in the device-off state, the processor 160 may switch the driving mode to the immediately-preceding mode. For example, if the processor 160 senses the second user input when the devices is turned off in the first mode, the processor 160 may switch the driving mode to the first mode. For another example, if the processor 160 senses the second user input when the devices is turned off in the second mode, the processor 160 may switch the driving mode to the second mode.

According to an exemplary embodiment, when displaying the static image in the display 110 in the second mode and when turning off the display 110 in the second mode, the processor 160 may display or remove the static image naturally. For example, when the processor 160 turns on the display 110 in an off state of the display 110 to display the static image, the processor 160 may fade in the static image and then may display the static image in the display 110. For another example, when the processor 160 turns off the display 110 in a state where the static image is displayed, the processor 160 may turns off the display 110 after fading out the static image.

According to an exemplary embodiment, the processor 160 may sense the movement of the user from the captured image based on at least one of the size of an object, a movement size, or a movement pattern. For example, the processor 160 may verify a moving object from an image captured during the first critical time by the image sensor. If verifying the moving object, the processor 160 may calculate the size of the object based on a ratio of pixels occupied by the verified object to pixels of the captured image. The processor 160 may determine whether the calculated size of the object is not less than a critical size. For another example, the processor 160 may detect the motion vector of the verified object and may determine whether the motion vector is not less than a specified size. For another example, if, in the image captured during the first critical time, the size of the object is not less than the critical size and the movement size is not less than the specified size, the processor 160 may determine that the movement of the verified object is the movement of the user. As such, in an exemplary embodiment, the processor 160 may accurately detect the movement of the user.

According to an exemplary embodiment, the processor 160 may verify the pattern of the motion vector and may determine whether the verified pattern is repeated. If the pattern of the motion vector is repeated, the processor 160 may turn off the display 110. As such, since it is difficult for the user to move while having a specific regularity, in the case where the pattern of the motion vector is repeated, the processor 160 may determine that the movement of the verified object is not the movement of the user, and may turn off the display 110.

According to an exemplary embodiment, the processor 160 may provide a first user interface in the first mode and may provide a second user interface different from the first user interface in the second mode. For example, in the case where the display device 10 is a TV, the first user interface may include channel selection, content selection, various settings (a volume or an image), and the like. For example, the second user interface may be for at least one of the setting (or changing), purchasing, or downloading of the static image.

According to an exemplary embodiment, the processor 160 may transmit configuration setting information of the second mode to an external electronic device through the communication module 140. For example, the configuration setting information may be information necessary for the external electronic device to display the second user interface. In an exemplary embodiment, if receiving the configuration setting information of the second mode from the external electronic device, the processor 160 may change the configuration setting value of the second mode based on the received configuration setting information of the second mode. For example, the configuration setting information may be information for setting the static image, the second critical time, or the like. If the configuration setting information of the second mode is receiving while operating in the first mode, the processor 160 may change a configuration setting value to the configuration setting value of the second mode when the first mode is switched to the second mode. The detailed configuration of the processor 160 and the external electronic device will be described with reference to FIG. 5.

Figure 3:
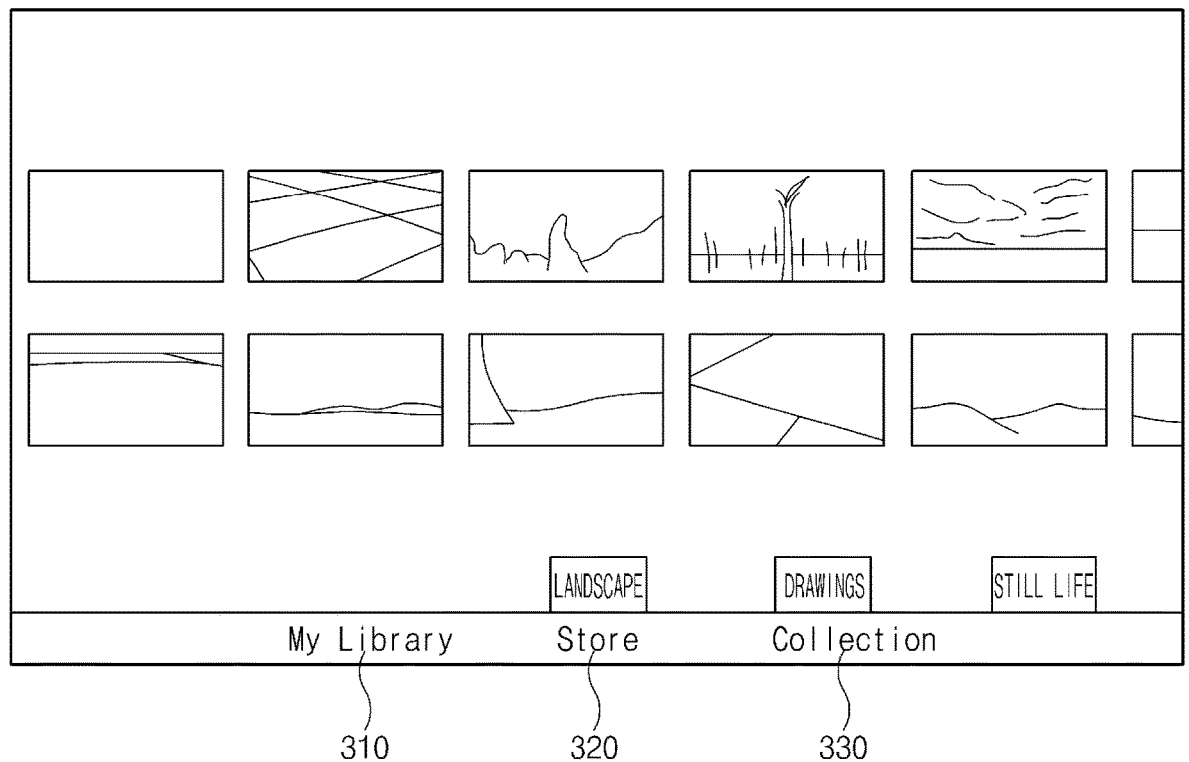
FIG. 3 is a view illustrating a second user interface according to an exemplary embodiment.
Figure 4A:
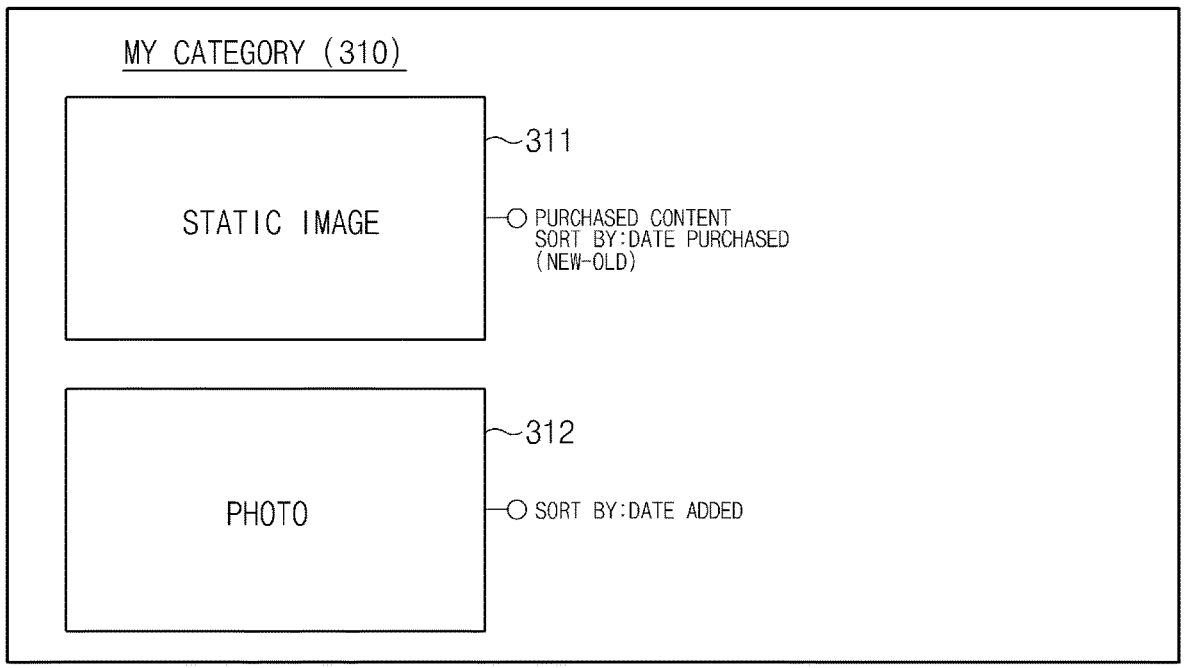
FIG. 4A is a view illustrating a second user interface of my category according to an exemplary embodiment.

FIG. 3 is a view illustrating a second user interface, according to an exemplary embodiment. FIG. 4A is a view illustrating a second user interface of my category, according to an exemplary embodiment. FIG. 4B is a view illustrating a second user interface of a collection category, according to an exemplary embodiment.

Referring to FIG. 3, according to an exemplary embodiment, the second user interface may be composed of or include a plurality of categories. The state where the second user interface is composed of three categories 310, 320, and 330 and the product category (store) 320 of the three categories 310, 320, and 330 is designated is described with reference to FIG. 3, as an example. However, exemplary embodiments may not be limited thereto. The three categories may include my category (my library) 310, the product category (store) 320, and the collection category 330.

The product category 320 of FIG. 3 may be a category for purchasing the paid static image. The product category 320 may be for managing the paid static image for each theme. For example, a plurality of themes may be landscapes, drawings, still life, land art, architecture, digital art, action, patterns, street art, wildlife, and the like. The processor 160 may provide a user interface for at least one of the displaying (preview), purchasing, or applying of the paid static image received from a second server, in the product category. For example, the processor 160 may provide work information including at least one of, for example, a title of a work, an artist name, or detailed information of a work or an artist from the product category 320. In an exemplary embodiment, the product category 320 may provide a user interface for verifying and purchasing the hardware accessory of the display device 10, for example, a bezel, a stand, or the like. In an exemplary embodiment, the processor 160 may communicate with the second server through the external interface or may communicate through the communication module 140.

My category 310 of FIG. 3 may be a category for verifying the static image stored in the memory 150. For example, as illustrated in FIG. 4A, the memory 150 may store the purchased static image 311 and a photo 312 stored in the memory 150. For example, each of static images may be sorted and displayed for each date purchased or for each date added.

The collection category 330 of FIG. 3 may be a category for downloading a free static image. For example, the free static image may be received from the second server. The processor 160 may provide a user interface for at least one of the displaying (preview), downloading, or applying of a free static image from the collection category 330 For example, the processor 160 may provide collection information including at least one of, for example, a title of a work, an artist name, a work, or detailed information of a work or an artist from the collection category. Referring to FIG. 4B, the collection category 330 may manage the free static image for each theme.

Figure 5:
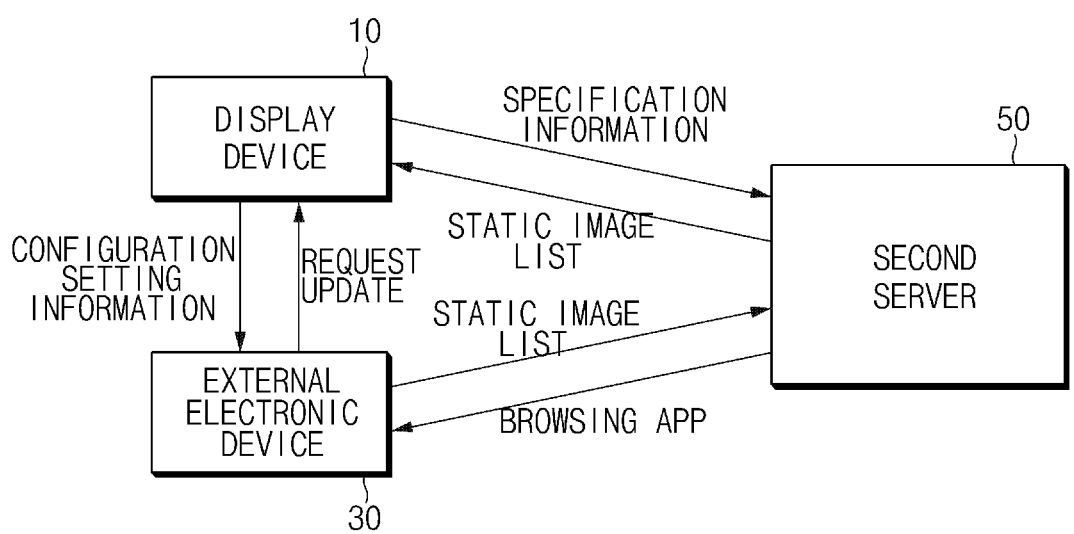
FIG. 5 is a flow diagram illustrating an interface among a display device, an external electronic device, and an external server, according to an exemplary embodiment.

FIG. 5 is a block diagram illustrating an interface among a display device, an external electronic device, and an external server, according to an exemplary embodiment.

Referring to FIG. 5, according to an exemplary embodiment, if entering the product category 320 or the collection category 330, the display device 10 (e.g., the processor 160) may transmit specification information of the display device 10 to a second server 50. For example, the specification information may include at least one of a model name of the display device 10 or login information.

According to an exemplary embodiment, the second server 50 may transmit a static image list to the display device 10 based on the specification information. In an exemplary embodiment, the second server 50 may verify the resolution or the mounting type (e.g., a wall mounting type, a stand type) of the display device 10, or the like based on the specification information and may transmit hardware accessory information of the display device 10. The second server 50 may be a server of a provider selling a static image, an accessory, and the like. For example, the second service may provide at least one of a service for selling the static image or a service for providing information of an accessory compatible with a display device.

According to an exemplary embodiment, the display device 10 may display an outline image (e.g., thumbnail) of the static image in the display 110 based on the specification information received from the second server 50. For example, the second server 50 may provide a static image list including the thumbnail of the static image corresponding to the received specification information.

According to an exemplary embodiment, if the user of the display device 10 makes a request for a preview of one among static images of the static image list provided by the second server 50, the display device 10 may make a request for the detailed image of the selected static image to the second server 50. In this case, the second server 50 may transmit the requested detailed image of the static image to the display device 10, and the display device 10 may receive the detailed image of the static image to display the detailed image of the static image on a full screen of the display 110. Until the static image is purchased, the detailed image of the static image may not be stored in the display device 10.

According to an exemplary embodiment, if the user requests to purchase or download one of static images, the second server 50 may provide the purchase interface or download interface of the requested static image. The second server 50 may transmit the static image, which is purchased or downloaded through the purchase interface or download interface and which corresponds to the specification information (e.g., a resolution) of the display device 10, to the display device 10.

According to an exemplary embodiment, the second server 50 may provide a browsing app capable of displaying a second user interface of the display device 10, in response to the request of an external electronic device 30.

According to an exemplary embodiment, if the browsing app is executed after being installed, the external electronic device 30 may display the second user interface on the screen of the browsing app based on configuration setting information of the second mode. Before that, there is a need for the external electronic device 30 to receive the configuration setting information of the second mode from the display device 10.

According to an exemplary embodiment, if the user changes the configuration setting information of the second mode by using the second user interface displayed on the screen of the browsing app, the external electronic device 30 may transmit the changed configuration setting information to the display device 10. For example, the user may perform at least one of purchasing, previewing, or downloading the static image by using the second user interface displayed on the screen of the browsing app and may request to apply the static image. In this case, the external electronic device 30 may transmit the static image and an application request (configuration setting information) to the display device 10.

According to an exemplary embodiment, if receiving information of the static image and the request to apply, the display device 10 may set the static image to be displayed in the second mode. The display device 10 may download the static image from the external electronic device 30 or the second server 50. As such, in an exemplary embodiment, while operating in a first mode, the display device 10 may change the configuration setting information of the second mode by using the external electronic device 30.

Figure 6:
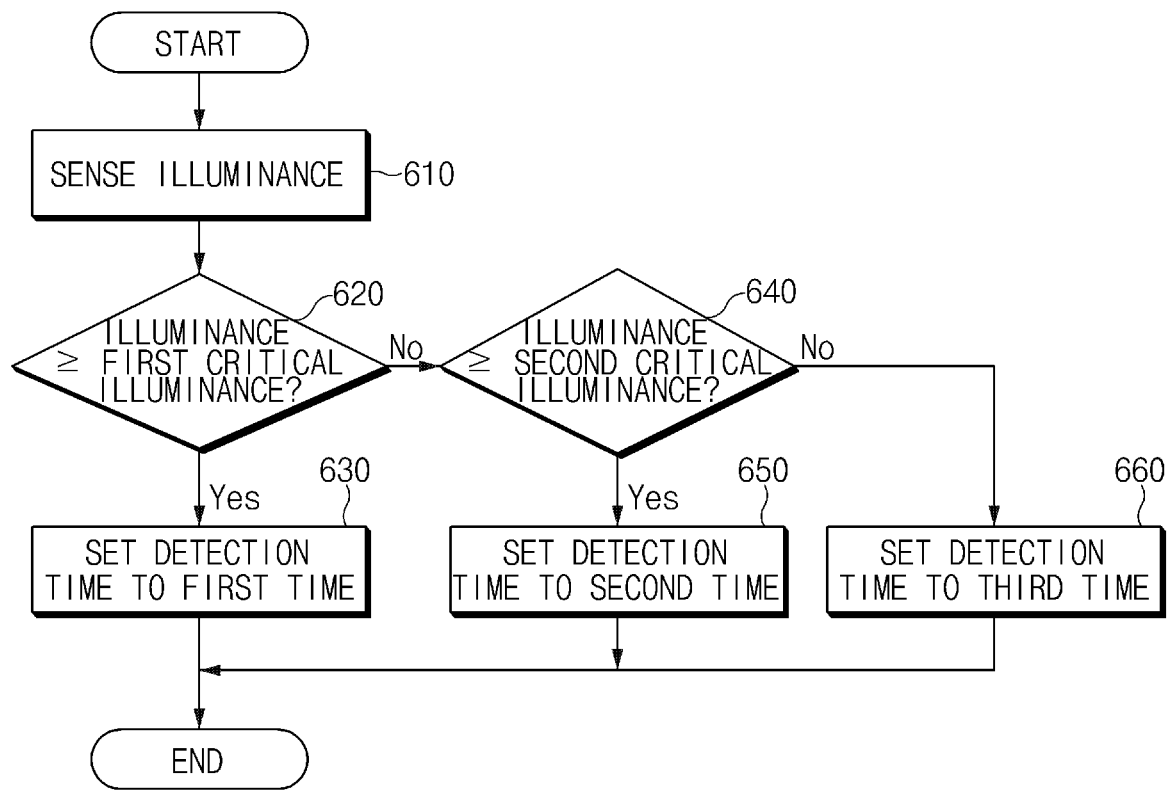
FIG. 6 is a flowchart illustrating a method of adjusting a first critical time depending on illuminance according to an exemplary embodiment.

According to an exemplary embodiment, in the case where the display device 10 receives the configuration setting information of the second mode while operating in the first mode, the display device 10 may change a configuration setting information to the configuration setting information of the second mode based on the configuration setting information of the second mode when entering the second mode. For example, in the case where the display device 10 verifies the information of the static image, which is applied in the second mode, while operating in the first mode, the display device 10 may download the static image from the second server 50 to store the downloaded static image in the memory 150 and may set the downloaded static image to the default static image of the second mode. Afterwards, if the driving mode is switched from the first mode to the second mode, the display device 10 may display the default static image. FIG. 6 is a flowchart illustrating a method of setting a first critical time depending on illuminance, according to an exemplary embodiment.

Referring to FIG. 6, in operation 610, the processor 160 may sense external illuminance by using an illuminance sensor.

In operation 620, the processor 160 may determine whether the sensed illuminance is not less than first critical illuminance. For example, the first critical illuminance may be 20 [lux].

In operation 630, if the sensed illuminance is not less than the first critical illuminance, the processor 160 may set a first critical time to a first time (e.g., 2 seconds). The first time may be a time period, which is the shortest, from among critical time periods each of which is capable of being set.

In operation 640, if the sensed illuminance is less than the first critical illuminance, the processor 160 may determine whether the sensed illuminance is not less than second critical illuminance. For example, the second critical illuminance may be 10 [lux].

In operation 650, if the sensed illuminance is less than the first critical illuminance and is not less than the second critical illuminance, the processor 160 may set the first critical time to a second time (<the first time). For example, the second time may be 3 seconds.

In operation 660, if the sensed illuminance is less than the second critical illuminance, the processor 160 may set the first critical time to a third time (<the second time). For example, the third time may be 5 seconds.

The case where the processor 160 sets the first critical time to be classified into 3 depending on the sensed illuminance is described with reference to FIG. 6 as an example. However, the first critical time may be set to be classified into 3 or more or less than 3 depending on the characteristic of an image sensor, or the like. As such, in an exemplary embodiment, when ambient illumination is reduced, a time (the first critical time) when the movement of the user is sensed may be extended, and thus the accuracy of detection of the user may be improved.

Figure 7:
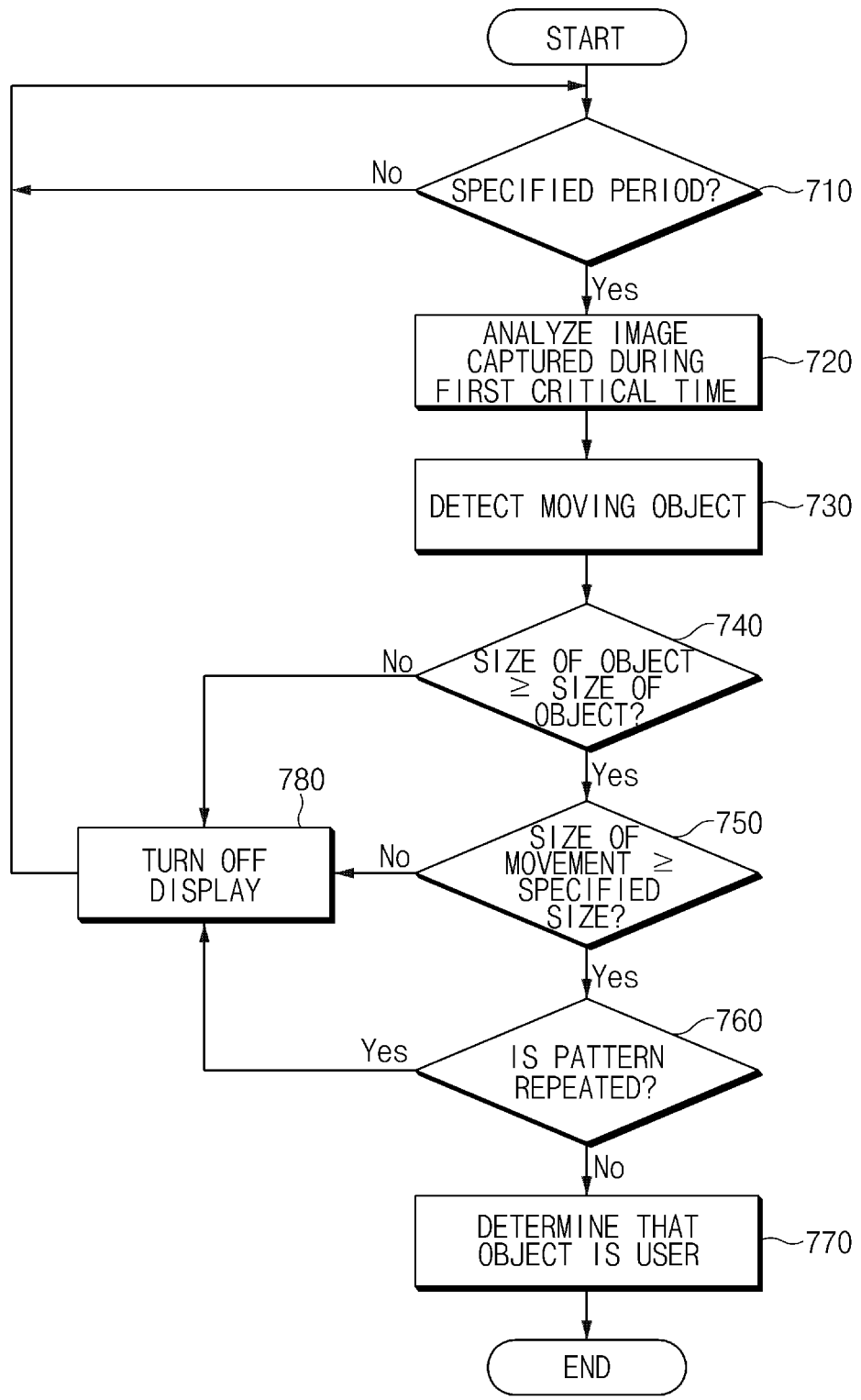
FIG. 7 is a flowchart illustrating a method of sensing movement of a user according to an exemplary embodiment.

FIG. 7 is a flowchart illustrating a method for sensing movement of a user, according to an exemplary embodiment.

Referring to FIG. 7, in operation 710, the processor 160 may determine whether a specified period elapses.

In operation 720, if the specified period elapses, the processor 160 may analyze an image captured by an image sensor during a first critical time. The first critical time may be set through the procedure of FIG. 6.

In operation 730, the processor 160 may verify a moving object from the image captured during the first critical time.

In operation 740, the processor 160 may determine whether the size of the verified object is not less than a critical size. For example, the processor 160 may calculate the size of the object based on a ratio of pixels occupied by the verified object to pixels of the captured image.

In operation 750, the processor 160 may determine whether the size of the motion vector of the verified object is not less than a specified size. For example, after detecting the motion vector from the captured image, the processor 160 may verify the size of the motion vector and may compare the size of the verified motion vector with the specified size.

In operation 760, the processor 160 may determine whether the pattern of the motion vector is repeated. The processor 160 may detect the pattern from the motion vector. Since the procedure of determining whether the pattern is repeated may be drawn by those skilled in the art from prior documents associated with a way to detect a pattern, the detailed description thereof may be skipped.

In operation 770, if the pattern of the motion vector is not repeated, the processor 160 may determine that the verified object is a user. Since the movement of the user is sensed through the procedure of operation 770, the processor 160 may display a static image in the display 110.

In operation 780, if the pattern of the motion vector is repeated, the processor 160 may turn off display 110 of an on state. As such, since the movement of the user is not uniformly repeated, in the case where the pattern of the motion vector is repeated, the processor 160 may determine that the motion vector is a noise and may ignore the noise. In addition, even in the case the size of the moving object is less than a critical size or even though the size of the motion vector is less than a specific size, the processor 160 may determine that the movement is not the movement of the user, and thus disregard the movement. In an exemplary embodiment, even though the moving object is detected from the captured image, the movement of the user may be detected after excluding the noise based on at least one of an object size, the size of the motion vector, or the pattern of the motion vector, thereby improving the accuracy of detection of the user.

Figure 8:
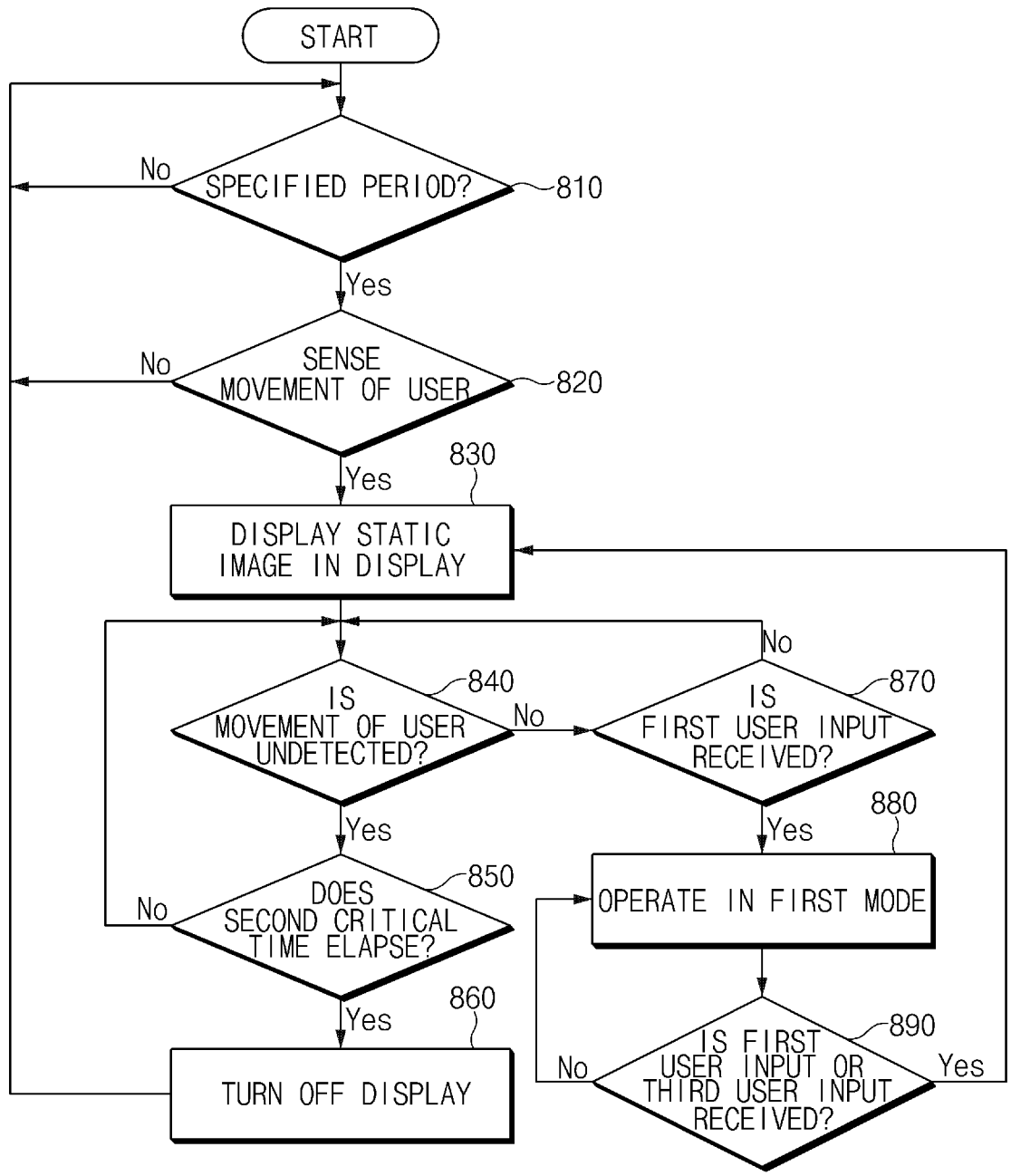
FIG. 8 is a flowchart illustrating a method of switching a driving mode according to an exemplary embodiment.

FIG. 8 is a flowchart illustrating a method for switching a driving mode, according to an exemplary embodiment.

Referring to FIG. 8, according to an exemplary embodiment, in operation 810, the processor 160 may monitor whether a specified period elapses. In operation 810, if the specified period elapses, the processor 160 may wake up an illuminance sensor and an image sensor.

In operation 820, if the specified period elapses, the processor 160 may sense the movement of a user through the procedure of FIG. 7.

In operation 830, if the movement of the user is sensed, the processor 160 may display a static image in the display 110.

In operation 840, the processor 160 may sense the movement of the user by using the image sensor while displaying the static image in the display 110.

In operation 850, if the movement is not sensed, the processor 160 may determine whether the movement of the user is not sensed during a second critical time. If AOD is set in the second mode, operation 840 and operation 850 may be skipped.

In operation 860, if the movement of the user is not sensed during the second critical time, the processor 160 may turn off the display 110.

In operation 870, while displaying the static image in the display 110, the processor 160 may determine whether a first user input is received from the input module 120.

In operation 880, if the first user input is received from the input module 120, the processor 160 may switch the driving mode to a first mode and the processor 160 may operate in the first mode. When the mode is switched to the first mode, the processor 160 may turn off the sensor module 130.

In operation 890, the processor 160 may determine whether the first user input or a third user input is received in the first mode. In operation 890, if the first user input or the third user input is received, the processor 160 may switch the driving mode to the second mode, and the processor 160 may perform operation 830.

Meanwhile, after not sensing the movement of the user in operation 820 or after performing operation 860, the processor 160 may perform operation 810. When the second mode ends, operation 810 to operation 890 may be completed.

Figure 9:
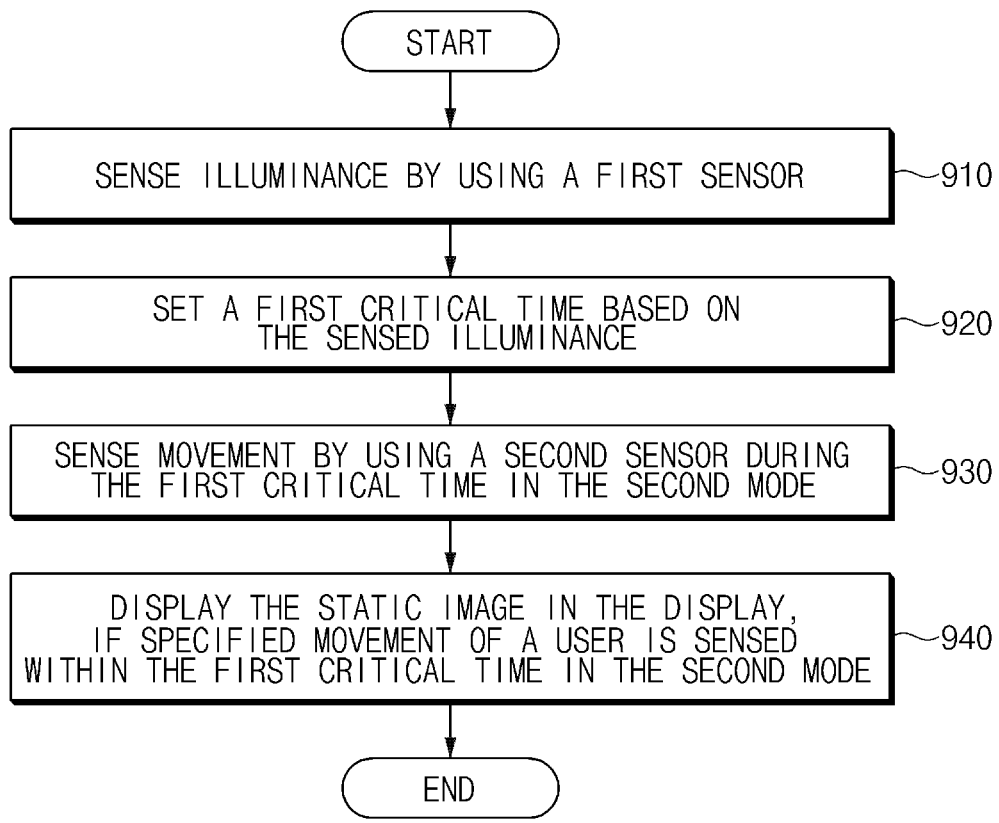
FIG. 9 is a flowchart illustrating a method of display an image according to an exemplary embodiment.

FIG. 9 is a flowchart illustrating a method for display method, according to an exemplary embodiment.

In operation 910, the processor 160 may sense illuminance by using a first sensor.

In operation 920, the processor 160 may set a first critical time based on the sensed illuminance.

In operation 930, the processor 160 may sense movement by using a second sensor during the first critical time in the second mode.

In operation 940, the processor 160 may display the static image in the display, if specified movement of a user is sensed within the first critical time in the second mode.

According to an exemplary embodiment, a display device includes a display; a first sensor configured to sense movement; a second sensor configured to sense illuminance; and a processor operatively connected with the display, the first sensor, and the second sensor, wherein the processor is configured to operate in a first mode or a second mode, wherein the first mode is a mode in which a dynamic image is displayed in the display, and wherein the second mode is a mode in which a static image is displayed in the display; set a first critical time for sensing the movement based on the illuminance; and if specified movement of an user is sensed in the second mode within the first critical time, display the static image in the display.

The processor is configured to if the movement of the user is not sensed during a second critical time in a state where the static image is displayed in the display, turn off the display.

The processor is configured to fade out the static image in the operation of turning off the display; and if the movement of the user is sensed, turn on the display and then fade in a static image to display the static image.

The processor is configured to as the sensed illuminance becomes lower, increase the first critical time; and as the sensed illuminance becomes higher, decrease the first critical time.

The processor is configured to if the sensed illuminance belongs to a first illuminance range, set the first critical time to a first time; if the sensed illuminance belongs to a second illuminance range, set the first critical time to a second time; and if the sensed illuminance belongs to a third illuminance range, set the first critical time to a third time; wherein the first illuminance range includes an illuminance value higher than the second illuminance range, wherein the second illuminance range includes an illuminance value higher than the third illuminance range, wherein the first time is shorter than the second time, and wherein the second time is shorter than the third time.

The processor is configured to if it is sensed by using the first sensor that an object of a critical size or more moves more than a specified movement size, determine that the movement of the user is sensed.

The first sensor includes an image sensor, and wherein the processor is configured to if verifying a moving object from an image captured by using the image sensor during the first critical time, calculate a size of the object based on a ratio of pixels occupied by the verified object to total pixels of the image.

The first sensor includes an image sensor, wherein the processor is configured to if verifying a moving object from an image captured by using the image sensor during the first critical time, detect a motion vector of the verified object; and calculate a size of the motion vector as a movement size of the object.

The processor is configured to verify a pattern of the motion vector; and if the pattern is repeated, ignore the motion vector.

According to an exemplary embodiment, the display device further includes an input module configured to receive a user input, wherein the processor is configured to if a first user input is received through the input module in the first mode, operate in the second mode; and if a second user input is received through the input module in the first mode, turn off the display, the first sensor, and the second sensor.

The processor is configured to provide a first user interface in the first mode; and provide a second user interface different from the first user interface, in the second mode.

According to an exemplary embodiment, the display device further includes a communication module configured to communicate with an external electronic device, wherein the processor is configured to receive configuration setting information of the second mode from the external electronic device through the communication module; and change a configuration setting value of the display device to a configuration setting value of the second mode based on the configuration setting information of the second mode.

The processor is configured to if the configuration setting information of the second mode is received in the first mode, change the configuration setting value when the first mode is switched to the second mode.

The display device operating in a first mode or a second mode, wherein the first mode is a mode in which a dynamic image is displayed in a display, and wherein the second mode is a mode in which a static image is displayed in the display, the method includes sensing illuminance by using a first sensor; setting a first critical time based on the sensed illuminance; sensing movement by using a second sensor during the first critical time in the second mode; and if specified movement of an user is sensed within the first critical time in the second mode, displaying the static image in the display.

According to an exemplary embodiment, the method further includes if the movement of the user is not sensed during a second critical time in a state where the static image is displayed in the display, turning off the display.

The setting includes at least one of as the sensed illuminance becomes lower, increasing the first critical time; and as the sensed illuminance becomes higher, decreasing the first critical time.

The displaying includes if an object of a critical size or more moves more than a specified movement size, determining that the movement of the user is sensed.

According to an exemplary embodiment, the method further includes if a first user input is received in the first mode, operating in the second mode; and if a second user input is received in the first mode, turning off the display, the first sensor, and the second sensor.

According to an exemplary embodiment, the method further includes communicating with an external electronic device to receive configuration setting information of the second mode from the external electronic device; and changing a configuration setting value of the second mode based on the configuration setting information of the second mode.

According to an exemplary embodiment, the method further includes if the configuration setting information of the second mode is received in the first mode, changing a configuration setting value of the second mode when the first mode is switched to the second mode.

The term "module" as used in the present disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an exemplary embodiment may be, for example, implemented by instructions stored in a computer-readable storage media in the form of a program module. The instruction, when executed by a processor 160, may cause the one or more processors to perform a function corresponding to the instruction. The computer-readable storage media, for example, may be the memory 150.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as generated by a compiler but also a high-level language code executable on a computer using an interpreter. The above hardware unit may be configured to operate via one or more software modules for performing an operation according to an exemplary embodiment, and vice versa.

A module or a program module according to an exemplary embodiment may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While exemplary embodiment have been shown and described with reference to the drawings, it will be understood by those skilled in the art that various changes in form and details may be made therein without departing from the spirit and scope of the present disclosure as defined by the appended claims and their equivalents.

What is claimed is:

1. A display device comprising:
a display;
a first sensor configured to sense movement; and
a processor operatively connected with the display, and the first sensor,
wherein the processor is configured to:
operate in one of a first mode and a second mode, the first mode is a mode in which a dynamic image is displayed in the display and the second mode is a mode in which a static image is displayed in the display, and
in response to a movement of a user being sensed by the first sensor, in the second mode within a first critical time, control the display to display the static image.

2. The display device of claim 1, wherein if the movement of the user is not sensed during a second critical time in a state in which the static image is displayed in the display, the processor is further configured to turn off the display.

3. The display device of claim 2, wherein the processor is further configured to:
fade out the static image in an operation of turning off the display, and
in response to the movement of the user being sensed by the first sensor, turn on the display and fade in a static image.

4. The display device of claim 1, further comprising:
a second sensor configured to sense illuminance,
wherein the processor is further configured to:
in response to a lower illuminance, being sensed by the second sensor, increase the first critical time; and
in response to a higher illuminance, being sensed by the second sensor, decrease the first critical time.

5. The display device of claim 4, wherein the processor is further configured to:
in response to determining that the illuminance, sensed by the second sensor, is in a first illuminance range, set the first critical time to a first time;
in response to the determining that the illuminance, sensed by the second sensor, is in a second illuminance range, set the first critical time to a second time; and
in response to the determining that the illuminance, sensed by the second sensor, is in a third illuminance range, set the first critical time to a third time;
wherein the first illuminance range comprises an illuminance value higher than the second illuminance range,
wherein the second illuminance range comprises an illuminance value higher than the third illuminance range,
wherein the first time is shorter than the second time, and
wherein the second time is shorter than the third time.

6. The display device of claim 1, wherein the processor is further configured to:
in response to the first sensor sensing an object of at least critical size moving more than a first movement amount, determine that the movement of the user is sensed.

7. The display device of claim 6, wherein the first sensor comprises an image sensor, and
wherein the processor is further configured to:
in response to verifying a moving object from an image captured by using the image sensor during the first critical time, calculate a size of the object that is sensed based on a ratio of pixels occupied by the verified moving object to total pixels of the image.

8. The display device of claim 6, wherein the first sensor comprises an image sensor,
wherein the processor is further configured to:
in response to verifying a moving object from an image captured by using the image sensor during the first critical time, detect a motion vector of the verified moving object; and
calculate a movement mount of the object that is sensed based on the motion vector.

9. The display device of claim 8, wherein the processor is further configured to:
verify a pattern of the motion vector; and
in response to the pattern being repeated, ignore the motion vector.

10. The display device of claim 1, further comprising:
an input interface configured to receive a user input,
wherein the processor is further configured to:
in response to a first user input received through the input interface in the first mode, operate in the second mode; and
in response to a second user input received through the input interface in the first mode, turn off the display and the first sensor.

11. The display device of claim 1, wherein the processor is further configured to:
provide a first user interface in the first mode, and
provide a second user interface different from the first user interface, in the second mode.

12. The display device of claim 1, further comprising:
a communication interface configured to communicate with an external electronic device,
wherein the processor is further configured to:
receive configuration setting information of the second mode from the external electronic device through the communication interface; and
change a configuration setting value of the display device to a configuration setting value of the second mode based on the configuration setting information of the second mode.

13. The display device of claim 12, wherein the processor is further configured to:
in response to the configuration setting information of the second mode being received in the first mode, change the configuration setting value when the first mode is switched to the second mode.

14. A display method comprising:
sensing a movement by a first sensor during a first critical time when a display device operates in a second mode, which is a mode in which a static image is displayed on a display of the display device; and
in response to said sensing the movement of a user within the first critical time in the second mode, displaying on the display the static image,
wherein the display device is further configured to operate in a first mode in which a dynamic image is displayed on the display.

15. The method of claim 14, further comprising:
in response to the movement of the user not being sensed during a second critical time in a state where the static image is displayed on the display, turning off the display.

16. The method of claim 14, further comprising:
sensing illuminance by a second sensor;
setting, by a processor, the first critical time based on the sensed illuminance,
wherein the setting the first critical time comprises at least one of:
increasing the first critical time in response to the sensed illuminance becoming lower, and
decreasing the first critical time in response to the sensed illuminance becoming higher.

17. The method of claim 14, wherein the sensing by the first sensor comprising:
in response to an object of at least critical size moves more than a specified movement amount, determining that the movement of the user is sensed.

18. The method of claim 14, further comprising:
in response to a first user input being received in the first mode, switching to operate in the second mode; and
in response to a second user input being received in the first mode, turning off the display, and the first sensor.

19. The method of claim 14, further comprising:

communicating with an external electronic device to receive configuration setting information of the second mode from the external electronic device; and changing a configuration setting value of the second mode based on the received configuration setting information of the second mode.

20. The method of claim 14, further comprising:

in response to configuration setting information of the second mode being received in the first mode, changing a configuration setting value of the second mode in response to switching from the first mode to the second mode.

* * * * *